May 15, 1951 E. C. BOWAR 2,552,766
CONTROL DEVICE

Filed April 29, 1948 3 Sheets-Sheet 1

Inventor
EARL C. BOWAR

George H. Fisher
Attorney

May 15, 1951 E. C. BOWAR 2,552,766
CONTROL DEVICE
Filed April 29, 1948 3 Sheets-Sheet 2
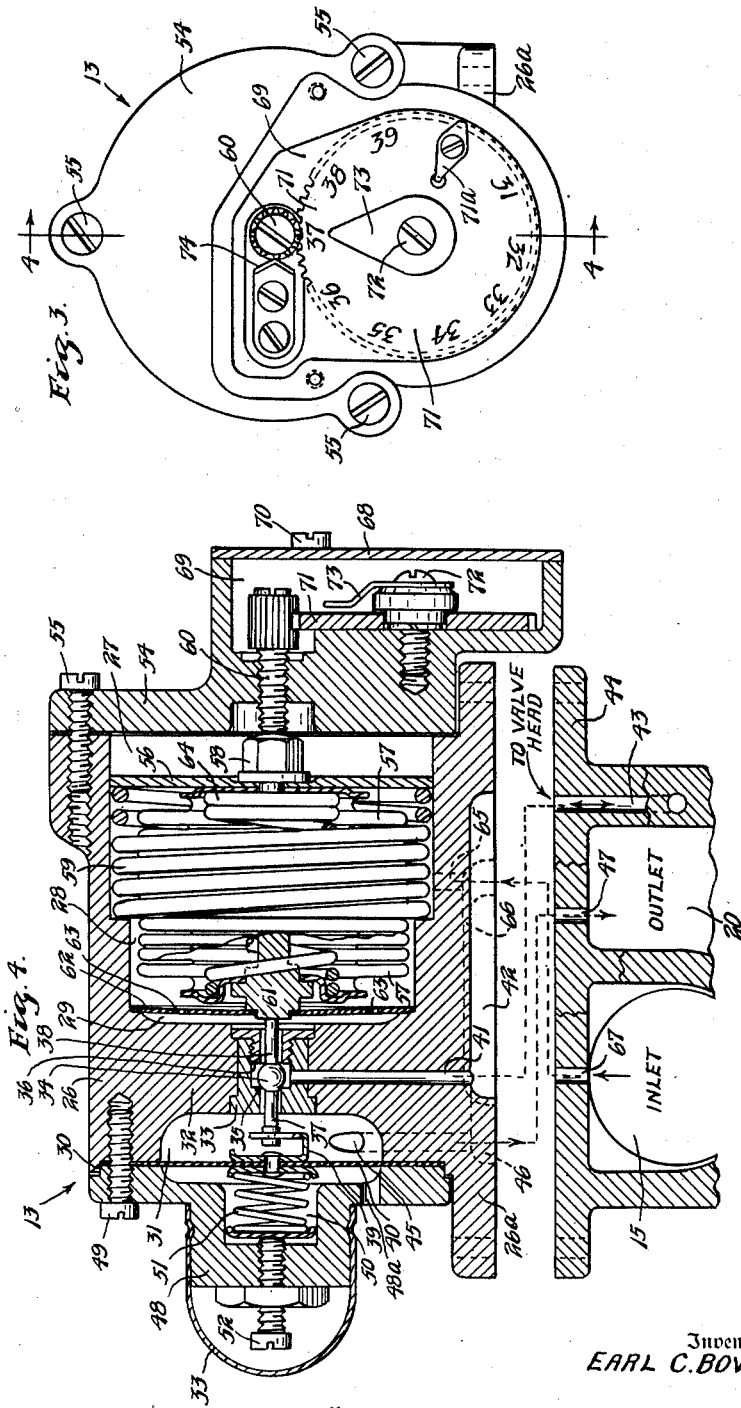
Inventor
EARL C. BOWAR
By George H. Fisher
Attorney May 15, 1951  E. C. BOWAR  2,552,766
CONTROL DEVICE
Filed April 29, 1948  3 Sheets-Sheet 3
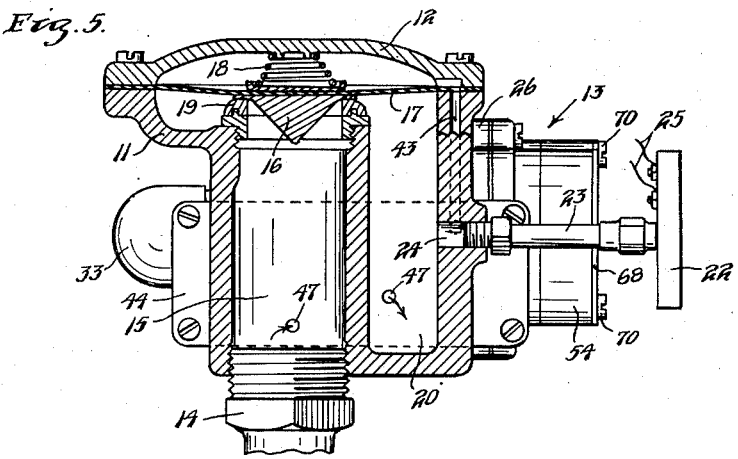
Inventor
EARL C. BOWAR
By George H. Fisher
Attorney Patented May 15, 1951

2,552,766

UNITED STATES PATENT OFFICE 2,552,766

CONTROL DEVICE

Earl C. Bowar, Minneapolis, Minn., assignor to Minneapolis-Honeywell Regulator Company, Minneapolis, Minn., a corporation of Delaware Application April 29, 1948, Serial No. 23,878

18 Claims. (Cl. 137—153)

The present invention is concerned with a control device for use with pressure control apparatus and, more particularly, it is concerned with a pressure responsive device for use with other apparatus to regulate the air pressure delivered by an exhaust driven supercharger, such as that found in the power unit of an airplane.

A common form of such a supercharger is a turbo-supercharger, in which a compressor is driven by a turbine operated by exhaust gases from combustion chamber, of an internal combustion engine. In order to control the discharge pressure of the supercharger, apparatus is provided by which the operation of the turbine and, hence, the operation of the compressor is controlled by a device responsive to the pressure condition on the discharge side of the supercharger, or carburetor, so as to maintain a selected pressure condition. A particularly desirable form of such a control is that shown in the patent to Daniel G. Taylor, No. 2,388,350, granted November 6, 1945. In this control, a normally balanced electrical network controls through an electronic amplifier the motor which positions a waste gate of a turbine driving the supercharger. This waste gate, by varying the amount of exhaust gas by-passed around the turbine, varies the speed of the latter and, hence, of the supercharger. Upon the pressure changing from the selected value, the network is unbalanced in one direction or the other to cause energization of the motor in such a direction as to position the waste gate in a manner to restore the pressure to the desired value. A system such as that described depends for its operation upon the maintainence of electrical power and the proper functioning of the various electrical devices. While the possibility of an electrical failure or the abnormal failure of the electrical devices is relatively slight, the hazard is sufficiently great as to lead to the proposal of employing additional means operating independently of the electrical system whenever the pressure on the discharge side of the supercharger exceeds a normal controlling range of values to cause movement of the waste gate of the turbo-supercharger toward an open position in which the speed of the turbine and, hence, of the compressor is reduced. An arrangement of this type is disclosed in the co-pending application of Hubert T. Sparrow, Serial No. 536,331, filed May 19, 1944, now Patent Number 2,433,326 patented February 23, 1947. In this application, an air operated motor is effective to adjust the linkage between the waste gate motor and the waste gate to move the waste gate to open position whenever the pressure on the discharge side of the turbo-supercharger exceeds a predetermined critical value.

Other control apparatus, in which the control device of this invention would be most readily utilized, is disclosed in the co-pending application of Stephen Crum, Serial No. 658,360, filed March 29, 1946 and in the co-pending application of Willis H. Gille, Serial No. 658,021, filed March 29, 1946, now Patent Number 2,487,049, patented November 8, 1949. These applications disclose an improvement on the above-mentioned systems of Taylor and Sparrow in that they provide an air motor which is effective to position the waste gate or other compressor controlling member in the event of the air pressure rising to an undesirable value due, for example, to a failure of electrical power. In the arrangement of the apparatus of these applications, the air motor takes the form of an air turbine which is mounted coaxially with the electrical motor and is effective to drive the waste gate through the rotor of the electrical motor. The means for sensing the pressure of the air from the supercharger and for delivering air to the air turbine below a predetermined maximum pressure comprises a pressure operated valve and a pressure release valve, respectively, between said supercharger outlet and the air turbine. The present invention is particularly concerned with improvement in the means for sensing the pressure in the outlet of the supercharger, or the outlet of the carburetor, for controlling the delivery of air to the air turbine in apparatus similar to that disclosed in the Gille and Crum applications.

An object of the present invention is to provide a control device adapted to initiate the flow of air to an air turbine upon a predetermined air pressure being reached and to thereafter regulate the air pressure to the air turbine.

Another object of the invention is to provide a control device having a pressure sensitive control valve for opening another valve when one predetermined pressure is reached and for throttling said other valve when a still higher pressure is reached.

A further object of the invention is to provide a diaphragm valve having a controller adapted to sense one pressure, deliver a second pressure to the diaphragm valve, and to limit the outlet pressure of said diaphragm valve.

A still further object of the invention is to provide a diaphragm valve-type of control device having a pressure sensitive controller therefor and having an opening in its outlet for connection to a normally closed, pressure-opened switch.

Another object of the invention is to provide a control device for use in control apparatus having an electric motor and an air turbine for driving a single control, which upon a predetermined pressure taking place in the apparatus, will break the circuit to the electric motor and supply regulated air to the air turbine.

Still further objects of the invention will become apparent upon reading the following detailed description of the invention in conjunction with the accompanying drawings wherein:

Figure 3 is an end view of the pressure sensitive controller of the control device, with the cover plate for the pressure adjusting mechanism removed;

Figure 4 is a cross-sectional view of the controller taken along line 4—4 in Figure 3, with portions of the control device broken away;

Figure 5 is a cross-sectional view of the control device taken along line 5—5 of Figure 2; and Figure 6 is a cross-sectional view similar to that of Figure 4 but showing a modified form of the control device.

Figure 1:
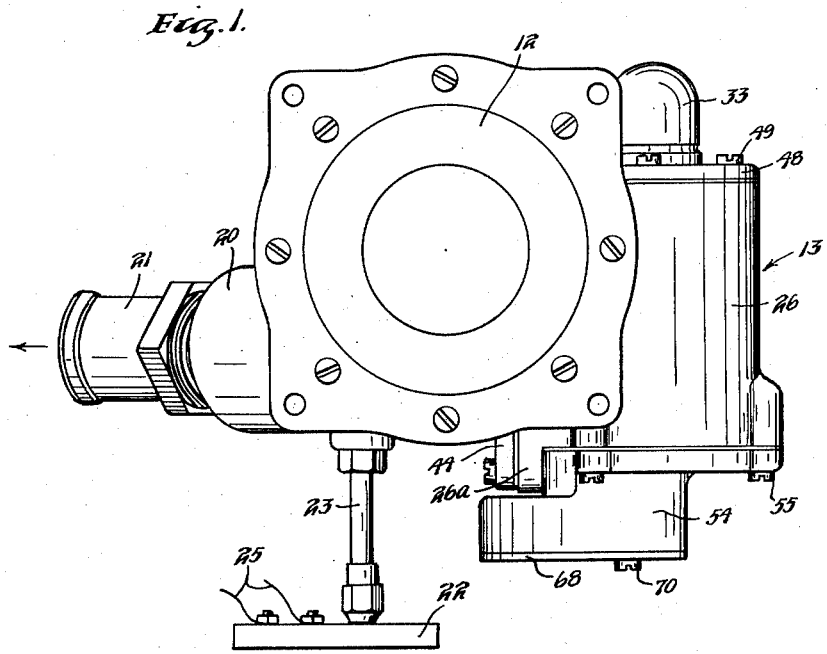
Figure 1 is a plan view of the control device.
Figure 2:
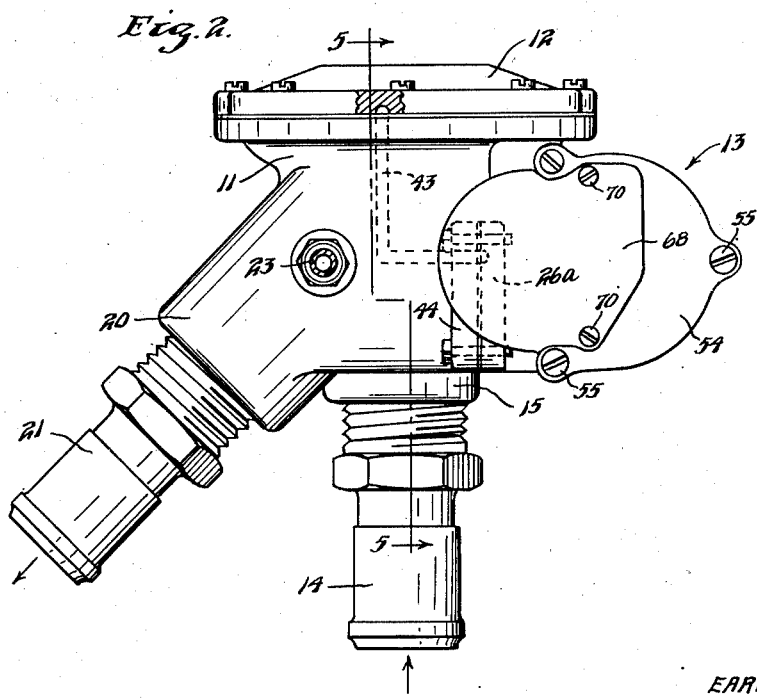
Figure 2 is a side elevational view of the control device, with portions thereof broken away.

As can best be seen in Figures 1 and 2 of the drawing, the control device comprises a diaphragm type of valve having a lower casting 11, and upper casting or valve head 12 and a controller 13. Figure 5 shows how a hose fitting 14 is screw-threaded into the inlet 15 of the diaphragm valve. A suitable hose or conduit (not shown) is adapted to be clamped or otherwise secured to the fitting 14 for connecting the control device to the outlet side of a supercharger of a control apparatus similar to that described in the above-mentioned applications of Crum and Gille. A valve 16 is suitably secured to diaphragm 17, which in turn is clamped between the peripheral edges of the lower casting 11 and the head 12. A compression spring 18 normally urges the valve 16 into seating engagement on a removable valve seat 19, screw-threaded into the upper end of inlet 15. The outlet 20 extends outwardly at less than a 90 degree angle from the inlet 15 and has, screw-threaded in its outer end, a hose fitting 21 similar to the hose fitting 14. The fitting 21 is adapted to be connected by means of a suitable conduit (not shown) to an air turbine of the above-mentioned type of control apparatus.

A normally closed, pressure-opened, electrical switch 22, the details of which form no part of this invention, is operatively connected through conduit 23 and opening 24 to the outlet 20 of the casting 11. This switch is adapted to be connected in series with an electric motor in the above-mentioned type of control apparatus through leads 25. It is thus seen that when the air pressure in the outlet 20 reaches a predetermined amount, the switch 22 will operate to open the circuit to the electric motor and thereby transfer the control of a waste gate of the above-mentioned apparatus to the air turbine only.

The means for controlling the operation of the diaphragm valve is the above-mentioned controller 13. It comprises a generally cylindrical body portion having stepped recesses 27, 28, 29, extending inwardly from one end thereof, and stepped recesses 30 and 31 extending inwardly from the other end thereof. A wall 32 separates the recesses 29 and 31. An opening through the wall 32 is sealed by a double-seat, three-way valve 33 of well known double-seat construction. A ball valve 34 is positioned between the valve seats 35 and 36 and has diametrically opposed and extending stems 37 and 38 passing through the openings of valve seats 35 and 36, respectively. The outer end of stem 37 terminates in recess 31 and is connected by link 39 to a diaphragm 40, to be described more fully hereinafter. The outer end of stem 38 terminates in recess 29 and is free. A passage 41, drilled through the wall 32 and the valve 33 establishes communication between the valve seats 35 and 36 and longitudinal groove 42 in the outer surface of a pad 26a on the body 26. The groove 42 communicates with a passage 43 which extends through the walls of a pad 44 on the casting 11, the wall of casting 11, diaphragm 17, and the wall of head 12 to the interior of head 12. The chamber 31, which cooperates with diaphragm 40 to form a pressure chamber, communicates with the outlet 20 through a passage 45, a groove 46, an opening 47 in the pad 44.

The above-mentioned diaphragm 40 is clamped at its marginal edge against the bottom of recess 30 by a cap member 48 and clamping screws 49. A recess 50 in the inner surface of the cap receives and guides a compression spring 51. The compression spring is positioned at one of its ends within a cup-shaped member secured to the diaphragm 40, on the opposite side thereof from the link 39, by means of a rivet passing through the three members. The other end of the spring 51 rests in a second cup-shaped member of substantially the same diameter as recess 50. The second cup-shaped member is adjustable inwardly and outwardly by means of an adjustment screw 52 threaded through the cap member. A cover member 53 surrounds the outer end of the adjustment screw 52 and removably engages side walls of the cap member. An opening 48a maintains an atmospheric pressure condition on the cap side of diaphragm 40.

A removable end wall 54 is secured by means of screws 55 to the end of the body 26 with sealing means therebetween, to form with the walls of recesses 27, 28 and 29, another pressure chamber. Slidably mounted in the outer end of recess 27, is an adjustable plate 56 that is secured to one end of a bellows 57 by means of a bolt 58. The plate 56 is biased outwardly by means of a compression spring 59 extending between said plate and a shoulder formed by the junction of recesses 27 and 28. The plate 56 is moved inwardly against the bias of spring 59 by means of an adjustment screw 60 threaded through the end plate 54. The inner end of the sealed bellows carries an abutment member 61 having an inwardly extending stop stem, for engagement with the inner end of bolt 58, and an outwardly extending stud passing through an aperture in a centering washer or spring 62 for abutment with the free end of stem 38 on ball valve 34. The centering spring or washer 62 is apertured at 63 and is slidably mounted in the recess 28. In its innermost position, the peripheral edge of the centering spring bears against the annular shoulder provided by the junction of recesses 28 and 29. A coil spring 64 is preferably provided in the bellows 57 for normally urging the ends of the bellows apart so as to normally maintain the ball valve seated against seat 35. A passage 65, groove 66 and opening 67 establishes communication between the bellows chamber and the inlet 15. It it thus seen that air under pressure in inlet 15 will transmit said pressure through the bellows chamber and the three-way valve to the top of the diaphragm valve and normally hold it in its closed position.

To provide means for accurately adjusting the spring loading of the bellows 57, to variably determine the pressure at which the ball valve 34 will move from its seat 35, a cover plate 68 is removably secured to the open end of a recess 69, formed in the outer surface of the end plate 54, by means of screws 70. A gear-shaped head on the adjustment screw 60, having a screw slot in the outer end thereof for rotation by a screwdriver or the like, meshes with a rotatable gear disc 71. The disc is pivoted in a screw 72 carrying a pointer 73. Indicia on the disc indicates the pressure at which the bellows will move the abutment member 61 away from the valve stem 38. A resilient detent 74, suitably secured to the bottom of recess 69, yieldingly meshes with the teeth on the head of screw 60 with sufficient force to prevent accidental rotation thereof. A stop 71a is secured to the disc 71 to limit the angular movement of the disc in both directions.

Operation

The elements of the control device, shown in Figures 1 through 5, are shown in the position they would normally assume when installed in the above-mentioned type of control apparatus for regulating the supercharger outlet pressure, generally known in the art as the upper-deck pressure. The ball valve 34 will remain seated against valve seat 35 as long as the supercharger or upper-deck pressure does not exceed a predetermined amount. As the inlet 15 is connected to the supercharger outlet or upper-deck, pressure therefrom will be transmitted through opening 67, groove 66, passage 65, the bellows chamber, valve 33, passage 41, groove 42, and passage 43 to the valve head pressure chamber over diaphragm 17 and valve 16 to maintain valve 16 closed. As soon as the upper-deck pressure exceeds the predetermined amount, said pressure will be transmitted to the above-mentioned passages to the bellows chamber to compress the bellows and move the abutment member 61 away from the end of stem 38. This permits the spring 51 to move the ball valve 34 away from valve seat 35 and thus bleed air from the valve head above diaphragm valve 16 to cause its opening. The opening of the diaphragm valve permits the passage of air from the upper-deck through inlet 15 and outlet 20 to the air turbine and to the pressure switch 22. When the pressure in the outlet 20 has reached a predetermined amount, the switch 22 will break the circuit to the electric motor which positions the exhaust waste gate of the supercharger. Breaking the circuit to this motor, enables the air turbine to more easily control the position of the waste gate to reduce the pressure developed by the supercharger. Should the upper-deck pressure become so excessive as to cause overloading of the air turbine, this excessive pressure will be transmitted from outlet 20 through opening 47, groove 46, and passage 45 into pressure chamber 31. This will cause movement of the diaphragm 40 against the bias of spring 48 with a consequent movement of ball valve 34 toward the valve seat 35, thus throttling the bleeding of air from above the diaphragm valve to cause partial closing thereof. The diaphragm valve will close sufficiently to reduce the outlet pressure to the air turbine to a safe operating pressure therefor. As will be gathered from the detailed description of the control device, maximum pressure delivered to the air turbine may be varied by moving the adjustment screw 52 inwardly and outwardly. Likewise, the maximum pressure setting for the upper-deck is varied by rotating the adjustment screw 60 to the setting desired and indicated by the indicia on disc 71.

Modification

A modified form of the control device is shown in Figure 6. This modification differs from the control device of Figures 1 to 5 in that a passage 65a, comparable to the passage 65 of Figure 4, communicates with a passage 65b which in turn is connected to a conduit (not shown) leading to the outlet side of the carburetor of the above-mentioned control apparatus. The outlet side of the carburetor is generally known in the art as the lower-deck and is designated in the drawing by L. D. To avoid the accumulation of fuel vapor in the bellows chamber, an additional passage 75 is substituted for the groove 66 of Figure 4 and establishes communication between the opening 67 and the space around valve stem 38. The cross sectional area of the space around stem 38 is reduced at the bellows end of the valve 33a by an inwardly extending annular shoulder. The shoulder is so shaped and proportioned as to permit only a very small amount of air to flow from passage 75 around stem 38 and into the bellows chamber continuously when the control apparatus is in operation. It is thus seen that due to the fact that the lower-deck pressure is less than the upper-deck pressure, there will be a constant flow of air from the inlet into the bellows chamber, even though at times there may be momentary surges of fuel-air mixture from the lower-deck toward the bellows chamber, to provide pressure sensing of the lower-deck by the bellows. Generally speaking, the pressure changes in the lower-deck will be sufficiently gradual that the pressure changes in the bellows chamber will be caused by the air coming from the inlet, through passage 75, and into the bellows chamber against the increasing back pressure from the lower-deck. The remaining parts of the control device of this modification is the same as that of Figures 1 to 5.

Modification operation

With the exception that the bellows 57 senses the pressure in the lower-deck of the above-mentioned type of apparatus, and that there will be a continuously but extremely small flow of air from the inlet or upper-deck through passage 75, restriction 76, bellows chamber, passage 65a and passage 65b to the lower-deck, the operation of the modification is identical with that of the first described control device. In other words, air pressure from the upper-deck normally holds the diaphragm valve closed and, only when the lower-deck pressure exceeds a predetermined amount, will the bellows move away from the valve stem 38, permitting the ball valve to leave its seat 35. This will cause movement of the ball valve close to or against valve seat 35 to throttle the passage of air from the upper-deck and to bleed air from over the diaphragm valve to cause its opening. The diaphragm 40 will operate as described above to regulate and limit the maximum air pressure to be delivered to the air turbine.

While the preferred and a modified form of the invention have been described above, it is obvious that various other modifications of the invention may be made by those skilled in the art without departing from the spirit of the invention. Therefore, it is to be understood that the scope of the invention is not to be determined by the above specific disclosures, but by the appended claims.

I claim as my invention:

1. A control device for a diaphragm valve or the like comprising a housing having two spaced pressure chambers, a double-seat valve having an opening in a side wall thereof between said seats, a control valve between said valve seats and having oppositely disposed and aligned stems, said opening communicating with said pressure head through passages formed in the walls of said housing, a first of said spaced pressure chambers containing a pressure responsive bellows secured at one end to a spring-biased movable plate, the other end of said bellows carrying an abutment member held in alignment with one of said stems by means of an apertured centering spring, a screw threaded through one end of said housing for moving said plate inwardly against the bias of its spring, an indicator disc rotatably engaged by said screw for indicating the pressure setting of said bellows, a passage in the walls of said housing between the exterior thereof and said first chamber, said bellows normally bearing against said stem for holding said control valve against the seat which permits fluid passage between said first chamber and the exterior of said housing but movable out of engagement with said control valve stem at a predetermined pressure to free said control valve for movement toward said bellows, a spring biased movable wall in the second of said spaced chambers and connected to the other stem, the spring for said movable wall being strong enough to move said control valve toward said bellows only when said bellows is out of engagement with said control valve, an adjustment screw for varying the spring loading of said movable wall, and a passage in the walls of said housing between said second chamber and the exterior of said housing.

2. A control device comprising a housing having two space dpressure chambers, a double-seat valve having an opening in a side wall thereof between said seats, a control valve with oppositely disposed and aligned stems positioned between said valve seats, said opening communicating with the exterior of said housing, a first of said spaced pressure chambers containing a pressure responsive bellows secured at one end to a spring-biased movable plate, the other end of said bellows carrying an abutment member held in alignment with one of said stems by means of an apertured centering spring, a first passage between the exterior of said housing and said first chamber, said bellows normally bearing against said stem for holding said control valve against the seat which permits fluid passage between said first chamber and the exterior of said housing through a second passage but movable out of engagement with said control valve stem at a predetermined pressure to free said control valve for movement toward said bellows, a movable wall in the second of said spaced chambers and connected to the other stem, said movable wall being resiliently biased enough to move said control valve toward said bellows only when said bellows is out of engagement with said control valve, and a third passage between said second chamber and the exterior of said housing.

3. A controller for a diaphragm valve comprising, in combination, a housing having two spaced pressure chambers, a double-seat valve having an opening in a side wall thereof between said seats and a control valve with oppositely disposed and aligned stems, said opening communicating with the exterior of said housing through a first passage, a first of said spaced pressure chambers containing a pressure responsive bellows secured at one end to a movable plate, the other end of said bellows carrying an abutment member held in alignment with one of said stems by means of a movable spacer, a second passage between the exterior of said housing and said first chamber, said bellows normally bearing against said stem for holding said control valve against the seat which permits fluid flow between said first chamber and the exterior of said housing but movable out of engagement with said control valve stem at a predetermined pressure to free said control valve for movement toward said bellows, a movable wall in the second of said spaced chambers and connected to the other stem, said movable wall being resiliently biased enough to move said control valve toward said bellows only when said bellows is out of engagement with said control valve, and a third passage between said second chamber and the exterior of said housing.

4. A controller for a diaphragm valve or the like comprising a housing having two spaced pressure chambers, a double-seat valve having an opening in a side wall thereof between said seats and a control valve therebetween, said opening communicating with the exterior of said housing through a first passage therein, a first of said spaced pressure chambers containing a pressure responsive bellows, a second passage between the exterior of said housing and said first chamber, said bellows normally holding said control valve against the seat which permits fluid flow between said first chamber and the exterior of said housing but movable out of engagement with said control valve at a predetermined pressure to free said control valve for movement toward said bellows, a movable wall in the second of said spaced chambers and connected to the control valve, said movable wall being resiliently biased enough to move said control valve toward said bellows only when said bellows is out of engagement with said control valve, and a third passage between said second chamber and the exterior of said housing.

5. A control device comprising a housing having two pressure chambers, a double-seat valve having an opening in a side wall thereof between said seats and a control valve therebetween, a first passage between the exterior of said housing and said opening, a first of said pressure chambers containing a pressure responsive bellows, a second passage between said first chamber and the exterior of said housing, said bellows normally holding said control valve against the seat which permits fluid flow through said first and second passages but movable out of engagement with said control valve at a predetermined pressure to free said control valve for movement toward said bellows, a movable wall in the second of said spaced chambers and connected to the control valve, said movable wall being resiliently biased enough to move said control valve toward said bellows only when said control valve, and a third passage between said second chamber and the exterior of said housing.

6. A control device comprising a casing having first, second and third pressure chambers, a valve positioned between said chambers to control the flow of fluid in said chambers, an inlet to said first chamber for admitting fluid from a source of fluid under pressure, pressure responsive means in said first chamber normally holding said valve in a position to allow fluid to flow from the first chamber to the third chamber but not to the second chamber, said pressure responsive means being movable at a predetermined pressure to a position which allows said valve to establish communication between said second chamber and said third chamber, said third chamber having pressure responsive control means therein, and said second chamber having pressure sensitive means therein separate from said valve for regulating the position of said valve to control the pressure in said third chamber.

7. A control device as defined in claim 6, wherein said pressure sensitive means comprises a spring loaded diaphragm connected to said valve.

8. A control device comprising a casing having first, second and third pressure chambers, a valve positioned between said chambers to control the flow of fluid in said chambers, an inlet to said first chamber for admitting fluid from a source of fluid under pressure, a spring loaded pressure responsive bellows having one end adjustable and the other end in abutting relationship with a stem on said valve for normally holding said valve in a position to allow fluid to flow from the first chamber to the third chamber but not to the second chamber, said pressure responsive means being movable at a predetermined pressure to a position which allows said valve to establish communication between said second chamber and said third chamber, said third chamber having pressure responsive control means therein, and said second chamber having pressure sensitive means therein for regulating the position of said valve to control the pressure in said third chamber.

9. A control device as defined in claim 8, wherein said pressure sensitive means comprises a spring loaded diaphragm connected to a stem on the other side of said valve from said bellows.

10. A control device comprising a casing having first, second and third pressure chambers, a valve positioned between said chambers to control the flow of fluid in said chambers, an inlet to said first chamber for admitting fluid from a source of fluid under pressure, pressure responsive means in said first chamber normally holding said valve in a position to allow fluid to flow from the first chamber to the third chamber but not to the second chamber, said pressure responsive means being movable at a predetermined pressure to a position which allows said valve to establish communication between said second chamber and said third chamber, said third chamber having a movable wall which controls a second valve and said second chamber having means separate from said first mentioned valve for modulating the position of said first mentioned valve.

11. A control device comprising a casing having first, second and third pressure chambers, a valve positioned between said chambers to control the flow of fluid in said chambers, an inlet to said first chamber for admitting fluid from a source of fluid under pressure, pressure responsive means in said first chamber normally holding said valve in a position to allow fluid to flow from the first chamber to the third chamber but not to the second chamber, said pressure responsive means being movable at a predetermined pressure to a position which allows said valve to establish communication between said second chamber and said third chamber, a second valve having inlet and outlet passages and controlled by fluid pressure in said third chamber, and said second chamber having an outlet connected to the outlet of said second valve and having pressure sensitive means separate from said first mentioned valve for modulating the position of said first mentioned valve.

12. A control device comprising a casing having first, second, third and fourth pressure chambers, a pressure operated valve including said third chamber and having an inlet and an outlet, said first chamber having a first pressure responsive means therein and an opening for connection to a source of fluid, the pressure of which is to be controlled, said second chamber having a second pressure responsive means and a valve seat opening and an opening for connection to said outlet, said fourth chamber having an opening communicating with said inlet and a valve seat opening and a much smaller opening for permitting fluid to flow from said inlet into said first chamber, a second valve between the valve seats in said second and fourth chamber, and an opening between said seats for communication with said third chamber, said second valve normally being seated on the second chamber's seat but being movable toward the other seat at a predetermined pressure in said first chamber.

13. A control device comprising a casing having first, second, third and fourth pressure chambers, a pressure operated valve including said third chamber and having an inlet and an outlet, said first chamber having a first pressure responsive means therein and an opening for connection to a source of fluid, the pressure of which is to be controlled, said second chamber having a second pressure responsive means and a valve seat opening and an opening for connection to said outlet, said fourth chamber having an opening communicating with said inlet and a valve seat opening and a much smaller opening for permitting fluid to flow from said inlet into said first chamber, a second valve between said valve seats connected to said second pressure responsive means and abutting said first pressure responsive means, and an opening between said seats for communication with said third chamber, said second valve normally being seated on the second chamber's seat but being movable toward the other seat at a predetermined pressure in said first chamber.

14. A controller for a fluid pressure operated valve comprising a first and a second pressure chamber having pressure responsive means therein and being separated by a double-seat valve having an opening between said seats for communication with said pressure valve, a control valve between said seats for operation by said pressure responsive means, said first chamber having an opening for communication with a source of fluid under pressure, said second chamber having an opening for communication with an outlet of said pressure valve, and another opening providing communication between an inlet of said pressure valve and a passage between said first chamber and the nearest of said valve seats, said last mentioned passage being constricted adjacent said first chamber.

15. A controller for a fluid pressure operated valve comprising a first and a second pressure chamber having pressure responsive means therein and being separated by a double-seat valve having an opening between said seats for communication with said pressure valve, a control valve connected to the pressure responsive means in said second chamber and abutting the pressure responsive means in said first chamber, said first chamber having an opening for communication with a source of fluid under pressure, said second chamber having an opening for communication with an outlet of said pressure valve, and another opening providing communication between an inlet of said pressure valve and a passage between said first chamber and the nearest of said valve seats, said last mentioned passage being constricted adjacent said first chamber.

16. A controller for a fluid pressure operated valve comprising a first and a second pressure chamber having pressure responsive means therein and being separated by a double-seat valve having an opening between said seats for communication with said pressure valve, a control valve connected to the pressure responsive means in said second chamber and abutting the pressure responsive means in said first chamber, the pressure responsive means in the first chamber normally urging the control valve toward the second chamber valve seat with a greater force than the pressure responsive means in said second chamber normally urges said valve in the other direction, said first chamber having an opening for communication with a source of fluid under pressure, said second chamber having an opening for communication with an outlet of said pressure valve, and another opening providing communication between an inlet of said pressure valve and a passage between said first chamber and the nearest of said valve seats, said last mentioned passage being constricted adjacent said first chamber.

17. A controller comprising a casing having a first pressure chamber with an inlet and a second pressure chamber with an outlet, two valve seats between said chambers, a control valve for cooperation with each of said valve seats, a first pressure responsive means in said first chamber normally biasing said valve away from the first chamber's valve seat, and a second pressure responsive means in said second chamber connected to and normally biasing said valve away from the second chamber's valve seat but with a force less than that of said first pressure responsive means.

18. A controller comprising a casing having a first pressure chamber with an inlet and a second pressure chamber with an outlet, two valve seats between said chambers, a control valve for cooperation with each of said valve seats, a first resiliently biased pressure responsive means in said first chamber normally abutting and biasing said valve away from the first chamber's valve seat, a second resiliently biased pressure responsive means in said second chamber connected to and normally biasing said valve away from the second chamber's valve seat but with a force less than that of said first pressure responsive means, and an opening in said casing between said valve seats for connection with a pressure operated control device.

EARL C. BOWAR.

REFERENCES CITED

The following references are of record in the file of this patent:

UNITED STATES PATENTS

| Number | Name | Date |
|---|---|---|
| 2,225,916 | Maglott | Dec. 24, 1940 |
| 2,397,117 | Ashton | Mar. 26, 1946 |
| 2,417,357 | Griswold | Mar. 11, 1947 |